(12) United States Patent
Nichols et al.

(10) Patent No.: US 8,556,167 B1
(45) Date of Patent: Oct. 15, 2013

(54) PREDICTION OF FUTURE CASH SUPPLY CHAIN STATUS

(75) Inventors: Michelle Nichols, Rock Hill, SC (US); Todd Atwood, Charlotte, NC (US); James Heddleson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/263,041

(22) Filed: Oct. 31, 2008

Related U.S. Application Data (60) Provisional application No. 61/061,987, filed on Jun. 16, 2008.

(51) Int. Cl.
*G06K 19/00* (2006.01)

(52) U.S. Cl.
USPC ............... 235/379; 235/375; 235/385; 705/5; 705/35

(58) Field of Classification Search
USPC .................. 235/375, 379, 385; 705/5, 35–45
See application file for complete search history.

(56) References Cited

U.S. PATENT DOCUMENTS

| | | | |
|---|---|---|---|
| 3,618,059 A | 11/1971 | Allen | |
| 4,352,097 A | 9/1982 | Hamann | |
| 4,443,692 A | 4/1984 | Nishimura | |
| 5,453,601 A | 9/1995 | Rosen | |
| 5,689,240 A | 11/1997 | Traxler | |
| 5,748,906 A | 5/1998 | Sandig | |
| 5,748,908 A | 5/1998 | Yu | |
| 5,936,220 A | 8/1999 | Hoshino et al. | |
| 5,952,639 A | 9/1999 | Ohki et al. | |
| 5,952,920 A | 9/1999 | Braddick | |
| 5,953,423 A | 9/1999 | Rosen | |
| 5,963,131 A | 10/1999 | D'Angelo et al. | |
| 6,028,517 A | 2/2000 | Sansone et al. | |
| 6,047,807 A | 4/2000 | Molbak | |
| 6,055,438 A | 4/2000 | Winner, Jr. | |
| 6,122,625 A | 9/2000 | Rosen | |
| 6,167,378 A | 12/2000 | Webber, Jr. | |

(Continued)

FOREIGN PATENT DOCUMENTS

| | | |
|---|---|---|
| DE | 4019265 | 11/1991 |
| DE | 4429815 | 2/1996 |

(Continued)

OTHER PUBLICATIONS

Powerpoint Presentation, DTS Product Overview, IFS, Apr. 2006, 17 pages.

(Continued)

*Primary Examiner* — Michael G Lee
*Assistant Examiner* — Matthew Mikels
(74) *Attorney, Agent, or Firm* — Banner & Witcoff, Ltd.; Michael A. Springs (57) ABSTRACT

A method for predicting future cash supply chain status includes tracking a plurality of monetary packages as they move along a cash supply chain. An quantity of monetary items that is estimated to arrive at a point along the cash supply chain on a future day, can be determined, based on tracking the monetary packages. Actions can then be taken based on the estimated quantity of monetary items. The calculation may be further based on expected positions of additional future monetary packages that are scheduled or predicted, based on history, to be received into the cash supply chain.

24 Claims, 7 Drawing Sheets

(56) References Cited

U.S. PATENT DOCUMENTS

| | | |
|---|---|---|
| 6,260,024 B1 | 7/2001 | Shkedy |
| 6,483,433 B2 | 11/2002 | Moskowitz et al. |
| 6,487,542 B2 | 11/2002 | Ebata et al. |
| 6,491,216 B1 | 12/2002 | May |
| 6,498,603 B1 | 12/2002 | Wallace |
| 6,526,273 B1 | 2/2003 | Link, II et al. |
| 6,633,881 B2 | 10/2003 | Drobish et al. |
| 6,736,314 B2 | 5/2004 | Cooper et al. |
| 6,788,203 B1 | 9/2004 | Roxbury et al. |
| 6,845,905 B2 | 1/2005 | Blad et al. |
| 7,004,385 B1 | 2/2006 | Douglass |
| 7,042,360 B2 | 5/2006 | Light et al. |
| 7,076,458 B2 | 7/2006 | Lawlor et al. |
| 7,149,336 B2 | 12/2006 | Jones et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,243,080 B2 | 7/2007 | Bhadra |
| 7,248,160 B2 | 7/2007 | Mangan et al. |
| 7,284,692 B1 | 10/2007 | Douglass |
| 7,348,886 B2 | 3/2008 | Himberger et al. |
| 7,350,230 B2 | 3/2008 | Forrest |
| 7,375,638 B2 | 5/2008 | Light et al. |
| 7,461,780 B2 | 12/2008 | Potts et al. |
| 7,474,217 B2 | 1/2009 | Himberger et al. |
| 7,537,153 B2 | 5/2009 | Hurwitz et al. |
| 7,577,612 B2 | 8/2009 | Waller et al. |
| 7,588,185 B2 | 9/2009 | Berquist et al. |
| 7,623,033 B2 | 11/2009 | Ainsworth et al. |
| 7,659,816 B2 | 2/2010 | Wandel |
| 7,714,708 B2 | 5/2010 | Brackmann et al. |
| 7,719,423 B2 | 5/2010 | Himberger et al. |
| 7,748,610 B2 | 7/2010 | Bell et al. |
| 7,778,456 B2 | 8/2010 | Jones et al. |
| 7,908,188 B2 | 3/2011 | Flynn et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0091937 A1 | 7/2002 | Ortiz |
| 2002/0095588 A1 | 7/2002 | Shigematsu et al. |
| 2002/0111916 A1 | 8/2002 | Coronna et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0011466 A1 | 1/2003 | Samuel et al. |
| 2003/0050891 A1 | 3/2003 | Cohen |
| 2003/0061153 A1 | 3/2003 | Birdsong et al. |
| 2003/0083936 A1 | 5/2003 | Mueller et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2004/0016796 A1 | 1/2004 | Hanna et al. |
| 2004/0056767 A1 | 3/2004 | Porter |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0124966 A1 | 7/2004 | Forrest |
| 2004/0201454 A1 | 10/2004 | Waterhouse et al. |
| 2005/0027594 A1 | 2/2005 | Yasnovsky et al. |
| 2005/0091129 A1* | 4/2005 | Tien .............................. 705/28 |
| 2005/0108164 A1* | 5/2005 | Salafia et al. .................. 705/42 |
| 2005/0183928 A1 | 8/2005 | Jones et al. |
| 2005/0258234 A1 | 11/2005 | Silverbrook et al. |
| 2005/0273347 A1 | 12/2005 | Dudley et al. |
| 2006/0131395 A1 | 6/2006 | Potts et al. |
| 2006/0247973 A1 | 11/2006 | Mueller et al. |
| 2006/0271441 A1 | 11/2006 | Mueller et al. |
| 2006/0282277 A1* | 12/2006 | Ng .................................. 705/1 |
| 2006/0288233 A1 | 12/2006 | Kozlay |
| 2007/0005452 A1* | 1/2007 | Klingenberg et al. ......... 705/27 |
| 2007/0008118 A1 | 1/2007 | Kassiedass |
| 2007/0012602 A1* | 1/2007 | Baldassari et al. ............ 209/583 |
| 2007/0034693 A1 | 2/2007 | Jouvin et al. |
| 2007/0063016 A1 | 3/2007 | Myatt et al. |
| 2007/0174156 A1 | 7/2007 | Emde et al. |
| 2007/0198341 A1 | 8/2007 | Park |
| 2007/0226142 A1 | 9/2007 | Hanna et al. |
| 2007/0282724 A1 | 12/2007 | Barnes et al. |
| 2008/0005019 A1 | 1/2008 | Hansen |
| 2008/0005578 A1 | 1/2008 | Shafir |
| 2008/0103959 A1 | 5/2008 | Carroll et al. |
| 2008/0120237 A1 | 5/2008 | Lin |
| 2008/0126515 A1 | 5/2008 | Chambers et al. |
| 2008/0149706 A1 | 6/2008 | Brown et al. |
| 2008/0155269 A1 | 6/2008 | Yoshikawa |
| 2008/0199155 A1 | 8/2008 | Hagens et al. |
| 2008/0223930 A1 | 9/2008 | Rolland et al. |
| 2008/0262949 A1 | 10/2008 | Bond et al. |
| 2008/0265019 A1 | 10/2008 | Artino et al. |
| 2008/0303903 A1 | 12/2008 | Bentley et al. |
| 2009/0006249 A1 | 1/2009 | Morgan et al. |
| 2009/0006250 A1* | 1/2009 | Bixler et al. .................... 705/39 |
| 2009/0032580 A1 | 2/2009 | Blachowicz et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0164364 A1 | 6/2009 | Galit et al. |
| 2009/0187482 A1 | 7/2009 | Blount et al. |
| 2009/0216662 A1 | 8/2009 | Crist et al. |
| 2010/0052844 A1 | 3/2010 | Wesby |
| 2010/0076853 A1 | 3/2010 | Schwarz |
| 2010/0274723 A1 | 10/2010 | Joab |

FOREIGN PATENT DOCUMENTS

| | | |
|---|---|---|
| DE | 19512045 | 10/1996 |
| DE | 19846452 | 12/1999 |
| DE | 20013021 | 11/2000 |
| DE | 102004039365 | 2/2006 |
| DE | 102005047711 | 4/2007 |
| EP | 1477949 | 11/2004 |
| GB | 2304953 | 3/1997 |
| WO | 9933040 | 7/1999 |
| WO | 03034359 | 4/2003 |
| WO | 2005041385 | 5/2005 |
| WO | 2005106722 | 11/2005 |

OTHER PUBLICATIONS

Durbin, "Ford's F-150 goes high-tech", retrieved from <http://www.wheels.ca/article/173134>, Feb. 6, 2008, 4 pages.

Monthly Minutes from Banking Technology Operations Standing Committee (BTO), dated Mar. 20, 2007, 2 pages.

Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.

Powerpoint Presentation, Guck, "PakTrak", Cash Shipment Package Tracking Concept Overview, Draft-Version 1.0, Mar. 14, 2008, 17 pages.

Powerpoint Presentation, RFID in Banking, May 21, 2008, 12 pages.

Monthly Minutes for RFID SIG dated Mar. 19, 2008, 2 pages.

International Search Report and Written Opinion for PCT/US2009/047452, mailed Aug. 25, 2009.

Office Action from related U.S. Appl. No. 12/262,534 dated Jun. 24, 2010.

Office Action from related U.S. Appl. No. 12/262,908 dated Mar. 8, 2010.

Office Action for U.S. Appl. No. 12/262,532, mailed Nov. 26, 2010.

Office Action for U.S. Appl. No. 12/262,432, mailed Dec. 7, 2010.

Final Office Action for U.S. Appl. No. 12/262,908 dated Aug. 18, 2010.

Non-Final Office Action for U.S. Appl. No. 12/262,432 dated Aug. 18, 2010.

(56) References Cited

OTHER PUBLICATIONS

European Search Report in EP09007879 dated Oct. 1, 2009.
European Search Report in EP09007878 dated Oct. 1, 2009.
Non-Final Office Action for U.S. Appl. No. 12/262,448 dated Sep. 15, 2010.
Non-Final Office Action for U.S. Appl. No. 12/262,526 dated Sep. 16, 2010.
Non-Final Office Action for U.S. Appl. No. 12/262,472, dated Oct. 18, 2010.
Non-Final Office Action for U.S. Appl. No. 12/262,534, dated Oct. 14, 2010.
Office Action for U.S. Appl. No. 12/262,523, mailed Nov. 9, 2010.
Office Action for U.S. Appl. No. 12/262,928, mailed Nov. 10, 2010.
Office Action for U.S. Appl. No. 12/262,115, mailed Nov. 16, 2010.
Office Action for U.S. Appl. No. 12/262,526, mailed Nov. 23, 2010.
Oracle Database SQL Reference, 10g Release 1 (10.1), Part No. B10759-01, Dec. 2003.
Office Action for U.S. Appl. No. 12/262,522, mailed Feb. 3, 2011.
Office Action for U.S. Appl. No. 12/262,448, mailed Feb. 1, 2011.
PR Newswire, "Airborne Express Announces New Pricing", New York, Jan. 29, 2001.
Anonymous, "Parcel Pickup now a click away at Canada Post", Canada Newswire, Aug. 31, 2011.

\* cited by examiner

PREDICTION OF FUTURE CASH SUPPLY CHAIN STATUS

CROSS-REFERENCE TO RELATED APPLICATIONS

This application claims priority to U.S. provisional patent application Ser. No. 61/061,987, filed Jun. 16, 2008, entitled "Cash Supply Chain Improvements," hereby incorporated herein by reference as to its entirety.

BACKGROUND

The cash supply chain is manual, complex, has inherent risk issues, and is dispersed throughout a network of customers, armored carriers, the Fed (Federal Reserve), and/or a network of client facing devices including but not limited to automatic teller machines (ATMs), cash vaults, banking centers, safes, cash recyclers, and other cash handling devices. The costs of depositing, distributing, and managing cash across a major bank, as well as the amount of daily excess cash carried by such a bank, can be on the order of billions of dollars.

Today's client deposit process does not adequately allow clients to view the status of their deposit bag as it makes its way from the client's site where the deposit was prepared to the bank or bank's representative who will continue the processing of the deposit. Deposit bags are handled multiple times in the current process (and possibly by many different parties), which increases potential errors and complicates finding missing deposits or understanding where errors occurred and assigning fiduciary responsibility for those errors. Pertinent pieces of deposit data are typically manually entered and reentered into various systems throughout the end-to-end processing of the deposit. The collaboration and sharing of information across multiple organizations and with multiple vendors may make this process very complex and increases risk to the bank and bank clients. For example, difficulty in obtaining timely and accurate information reflecting the flow of cash through a cash supply chain restricts the ability of a bank to increase efficiency in processing cash transfers and other operations. As another example, difficulty in projecting future cash supply chain status restricts a bank's ability to communicate useful information to clients regarding the clients' monetary positions. Still other disadvantages of modern systems and methods are recognized by those skilled in the art.

BRIEF SUMMARY

Aspects as described herein are directed to tracking monetary packages, which may contain monetary items such as foreign and domestic government-issued legal-tender paper currency, coins, checks, coupons, food stamps, credit cards, negotiable money orders, and/or other negotiable instruments as well as non-negotiable collateral information, throughout the cash supply chain. In carrying out daily financial transactions, it is typical for monetary packages to be physically transferred between various parties, such as but not limited to a bank client (or a client of another financial institution who is leveraging the services of the bank), a transporter (e.g., an armored carrier), a bank vault, and even various stations within a bank vault. This transfer amongst various parties is referred to as the cash supply chain. Because many types of cash are reusable/recyclable, the same physical cash is usually cycled through the cash supply chain multiple times.

For transport through the cash supply chain, a financial transaction such as a deposit including one or more monetary items is normally bundled or otherwise packaged together as a monetary package. Depending upon the location within the cash supply chain, the monetary package may maintain together a quantity of monetary items as a single entity by way of, e.g., a bag (in which the monetary items are placed within the bag, which may be sealed), by way of a cassette for holding the monetary items, and/or by way of one or more straps (which may also be within the bag).

While a number of techniques to automate transaction handling have been attempted, there remains a need to increase the efficiency and accuracy of the financial transaction process. Consequently, it is desirable to increase the speed and accuracy of the financial transactions and to reduce the labor required to perform the transactions. It is also desirable to make information relating to the financial transaction rapidly available to the client, third party vendors, and the bank, and to identify more quickly problematic locations in the financial transaction, identify potential accounting issues, and identify industry trends. Information about a deposit or withdrawal, for instance, should be provided in an expeditious fashion as it is processed along a cash supply chain, where notification/reporting is customizable and automatic for enhancing the client's experience and for improving internal processes of a bank.

According to further aspects, monetary packages are tracked via a centralized tracking system that communicates with the various parties handling the monetary packages throughout the entire supply chain and/or when a carrier is set to arrive. Each time a monetary package changes status in the cash supply chain (e.g., transfers from one party to another or changes physical location), an involved party (e.g., the party receiving the monetary package and/or the party providing the monetary package) updates the centralized tracking system with the status. The centralized tracking system may be updated using a network of automated sensors that do not necessarily require the intervention of a party to create the update. These updates may be communicated to the centralized tracking system (system of record) in real time or near real time. Such a centralized tracking system may allow the bank or other service provider to offer a variety of services to the client.

For instance, centralized monetary package tracking may allow for more accurate reporting of monetary package status. And, by pre-scheduling (initiation) of deposits and change orders into the centralized tracking system, anomalies in the transport of a monetary package (e.g., a lost or delayed cash package) may be recognized much earlier, even prior to actual deposit or arrival of the package at the processing site.

According to one aspect, a method includes determining a quantity of monetary items that is estimated to arrive at a future point along the cash supply chain on a future day. This determination is based on tracking the monetary packages received into a cash supply chain, such as though the centralized monetary package tracking described herein. The calculation may be further based on expected positions of additional future monetary packages that are predicted or scheduled to be received into the cash supply chain.

According to another aspect, the positions of the monetary packages can be recorded at each of the points along the cash supply chain, such as by the centralized monetary package tracking described herein. The method further includes determining a quantity of monetary items that is estimated to arrive at a selected point along the cash supply chain. This calculation is based on the positions of the monetary packages.

According to further aspect, a method includes predicting at least one predicted additional monetary package to be received into the cash supply chain, and determining a quantity of monetary items that is estimated to arrive at a future point along the cash supply chain. The calculation is based on tracking the monetary packages and the predicted additional monetary package(s). Historical information can be used to predict additional monetary packages to be received into the cash supply chain.

According to a still further aspect, a method involves determining a quantity of monetary items that is estimated to arrive at a future point along the cash supply chain, and coordinating an arrival time of a transporter carrying at least some of the monetary packages, based on the estimated quantity of monetary items.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
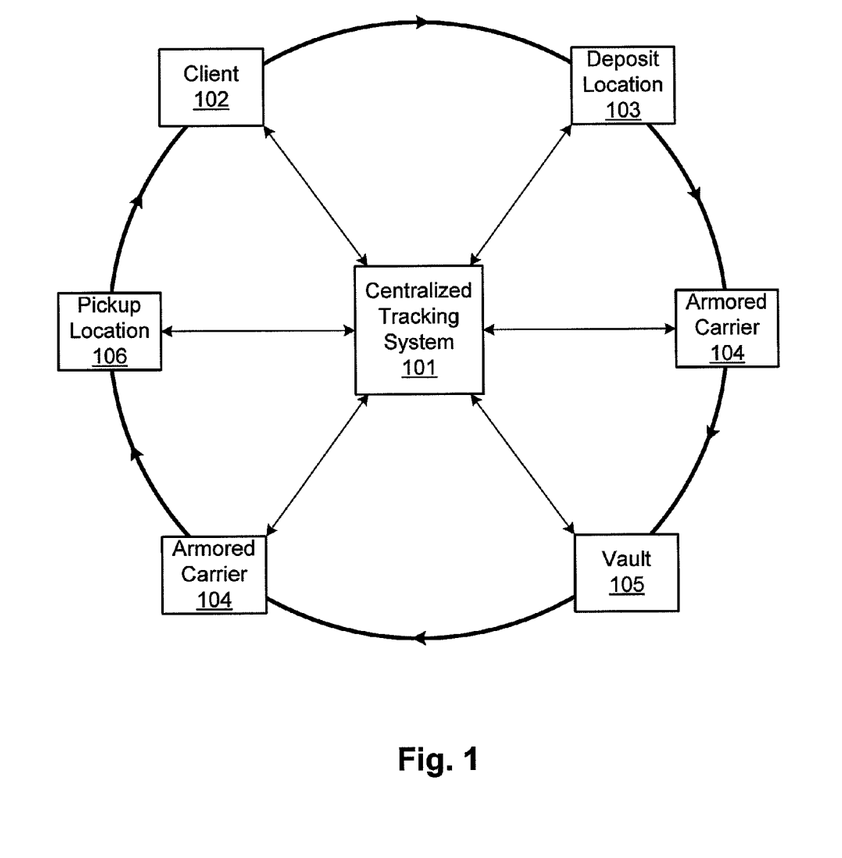
FIG. 1 is a graphical depiction of an illustrative cash supply chain for a deposit/withdrawal lifecycle, including a centralized tracking system.

FIG. 1 is a graphical depiction of an illustrative cash supply chain for a monetary item deposit/withdrawal lifecycle. In this example, a centralized tracking system 101 communicates with various parties, such as a bank client 102, a deposit location 103, an armored carrier 104 or other transport service, a bank vault 105, and a pickup location 106. Communication between centralized tracking system 101 and the various parties 102-106 may be performed across any one or more communication media. Examples of communication media include, but are not limited to, a network such as the Internet, a local-area network or LAN, a wireless LAN or WLAN, and/or a telephone network such as a landline telephone network and/or a cellular telephone network. Other examples of communication media include a dedicated landline link and/or satellite or other wireless link. While not explicitly shown, monetary items may be processed internally within a node (e.g., within bank vault 105). Consequently, each node may have a network within itself.

Centralized tracking system 101 may include at least one computing device and at least one computer-readable medium that, together, are configured to receive monetary package status reports from parties such as parties 102-106, maintain data representing the monetary package status, and generate reports and alert messages from that monetary package status data. A "computing device" as referred to herein includes any electronic, electro-optical, and/or mechanical device, or system of physically separate such devices, that is able to process and manipulate information, such as in the form of data. Non-limiting examples of a computing device includes one or more personal computers (e.g., desktop or laptop), servers, personal digital assistants (PDAs), ultra mobile personal computers, smart phones, cellular telephones, pagers, and/or a system of these in any combination. In addition, a given computing device may be physically located completely in one location or may be distributed amongst a plurality of locations (i.e., may implement distributive computing). A computing device may even be a mobile device. Centralized tracking system 101 may further support co-operation with other non-bank tracking systems.

A computing device typically includes both hardware and software. The software may be stored on a computer-readable medium in the form of computer-readable instructions. A computing device may read those computer-readable instructions, and in response perform various steps as defined by those computer-readable instructions. Thus, any functions attributed to a computing device as described herein may be defined by such computer-readable instructions read and executed by that computing device, and/or by any hardware (e.g., a processor) from which the computing device is composed.

The term "computer-readable medium" as used herein includes not only a single medium or single type of medium, but also a combination of one or more media and/or types of media. Such a computer-readable medium may store computer-readable instructions (e.g., software) and/or computer-readable data (i.e., information that may or may not be executable).

Referring again to FIG. 1, bank client 102 may include not only registered customers of a bank that have a financial account (e.g., checking or savings account) maintained by the bank, but also customers that do not have a financial account with the bank but are otherwise doing business with the bank. Clients may also be another bank or a bank agent or business partner including local, state, or federal governments, and may also be extended to include a chain of a bank's customer's customers. As will be discussed, bank client 102 may receive a notification of an event along the cash supply chain at phone 102a or terminal 102b through a wireless network or the Internet.

Deposit location 103 is the location at which client 102 releases custody of the deposit (such as in the form of a monetary package). This custody may be released by, for instance, depositing the monetary into a cash handling device (e.g., a cash recycler, depository, exchange, dispensing machine, or ATM), or at a bank teller, or even at the client's own location where an armored carrier would pick up the deposit from the client. Pickup location 106 is the location at which client 102 receives custody of the monetary items (which may or may not be prepared by client 102 and which may be in the form of a monetary package), such as from an armored carrier, bank teller, or cash handling device.

Vault 105 is typically a secured location or device in a bank or customer's office where the deposit is processed. In the case of a vault in an armored carrier's or bank's facility, once the deposits are processed, currency or other monetary items are strapped for storage and distribution. A vault may not only process incoming monetary items but may also provide monetary items such as currency to clients. These requests for currency, commonly called "change orders," are generally standing orders for specific amounts that are sent on a specific schedule, but can be on-demand or non-standing orders that are requested for a specific time. With some embodiments, currency may be verified by the one transporting the currency. This may be because the carrier is trusted and in an appropriate liability agreement with the bank, or the bank owns a carrier. In that case, some or all of the funds may be verified (or trusted due to the device the funds came from) and re-used in the cash supply chain without going to the vault. For example, the carrier may use a hand-held device to check the next location to visit or receive notices that a site needs cash. The carrier may use the verified cash to fulfill the order.

Armored carrier 104a/104b (which may be referred to as a "vendor") transports monetary packages between different stages along the cash supply chain typically in an armored vehicle. The physical transportation could be any type of transportation, however, including a courier or package delivery service with a secured package.

Parties 102-106 may communicate with centralized tracking system 101 over corresponding communications channels. Different types of communications channels may be supported. For example, centralized tracking system 101 may communicate with client 102 through a computer terminal (via the Internet) and/or a wireless telephone, with an armored carrier through a handheld scanner with a wireless communications interface, and with a bank employee through a work station (e.g., via an intranet). A communications channel may utilize different communications media, including a wired telephone channel, wireless telephone channel, and/or wide area channel (WAN).

Figure 2:
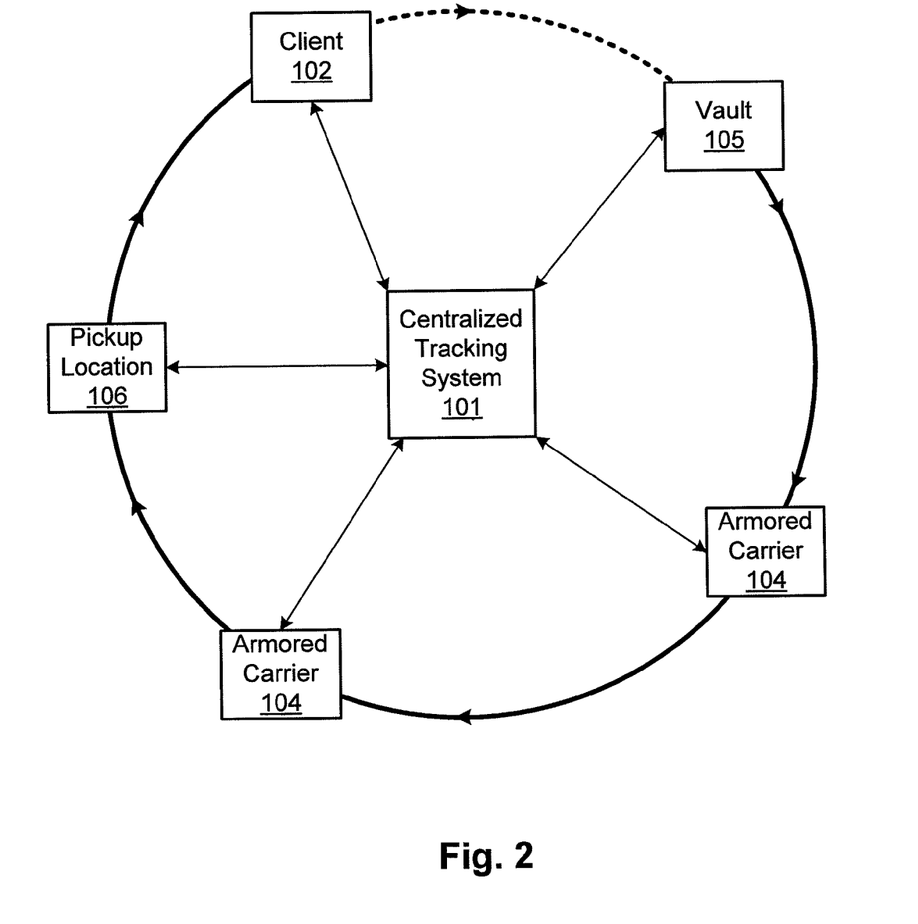
FIG. 2 is a graphical depiction of an illustrative cash supply chain for a change order lifecycle, including a centralized tracking system.

FIG. 2 is a graphical depiction of an illustrative cash supply chain for a change order lifecycle. A change order is a financial transaction in which a client (such as client 102) requests and receives a predefined sum in a predefined set of one or more denominations. For example, client 102 might request a particular amount of currency with X amount of ten dollar bills, Y amount of twenty dollar bills, and Z amount of one dollar bills. While any type of client may implement a change order, this type of transaction is particularly common for business clients that require a certain amount of currency in hand each day for their cash registers. With some embodiments, a change order may be initiated by the bank using forecasting systems for cash handling devices.

As can be seen in FIGS. 1 and 2, a monetary package transfers from party to party, with the exception of the broken line in FIG. 2 that indicates a request by client 102 rather than a physical transfer of a monetary package. Each time the monetary package changes hands and/or changes physical locations, centralized tracking system 101 may be updated. A physical location may two different nodes, or within the same node, of the cash supply chain. For example, monetary items are typically moved from receiving of a vault to a teller of the vault. In addition, any of these parties (or even other parties not shown) may at any time query centralized tracking system 101 to determine the current status, historical status, and planned future status of the monetary package. To aid in tracking monetary packages, each monetary package may physically include an identifying device having an associated identifier that is unique to that monetary package. The identifying device may be any device that stores human-readable and/or computer-readable information on some type of medium. Examples of such an identifying device include a radio-frequency identification (RFID) tag or other wirelessly readable tag, a bar code or other visual label, or printed ink made directly on or in the monetary package. The identifier itself may be made up of any one or more symbols that together make up a unique combination, such as one or more numbers, letters, icons, dots, lines, and/or any one-, two-, or higher-dimensional patterns.

Figure 3:
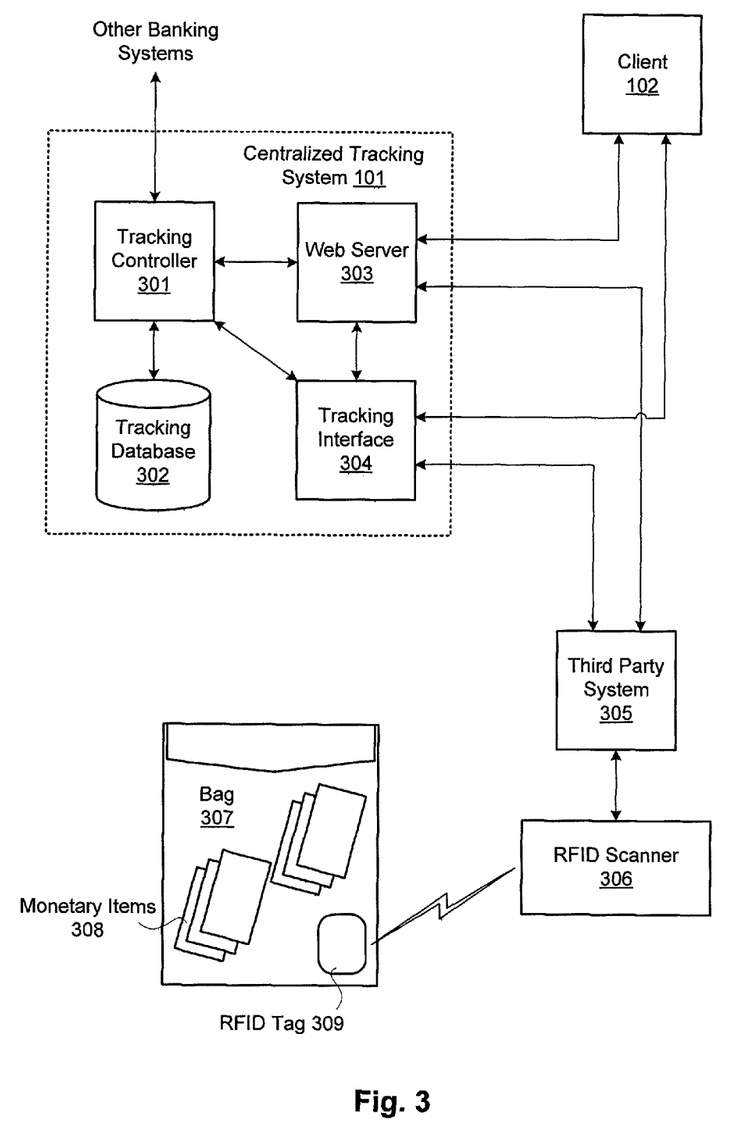
FIG. 3 is a functional block diagram of an illustrative monetary package tracking environment.

FIG. 3 is a functional block diagram of an illustrative monetary package tracking environment. In this example, centralized tracking system 101 is shown to include a tracking controller 301, tracking database 302, a web server 303, and a tracking interface 304. Each of units 301, 303, and 304 may be implemented as or otherwise include a computing device. It should be noted that the divisions between functional blocks in FIG. 3 is merely illustrative, and that the physical division of computing devices and other equipment may be different from the functional division. Moreover, some or all of the functional blocks may be combined or further subdivided functionally and/or physically.

Tracking database 302 may be implemented as or otherwise include a computer-readable medium for storing data. This data may be organized, for instance, as a relational database that is responsive to queries such as structured query language (SQL) queries. Tracking database 302 may be distributed and may collaborate with internal and/or external sources to fulfill the completeness of the data utilized for notifications.

In this example, tracking controller 301 may be configured to add, edit, update, delete, and query data stored in tracking database 302. The data stored in tracking database 302 may include, for instance, data indicating the current status of each of a plurality of monetary packages. For example, the data may indicate that a given monetary package is with a particular armored carrier, and that it was transferred to the armored carrier at a certain time on a certain date. The status data may be associated with the unique identifier of the relevant monetary package.

Web server 303 may be configured to generate an Internet web page that is accessible by client 102 and/or other parties. The web page may be used to query tracking database 302 via tracking controller 301. For example, a party using the web page may be able to enter an identifier associated with a monetary package. In response, web server 303 may request tracking controller 301 to query tracking database 302 (or alternatively web server 303 may generate the query itself) for that identifier. The query response is forwarded by tracking controller 301 to web server 303, and displayed on the web page for review by the party. The query response may include, for instance, the status data associated with the identifier. Many other types of query transactions are possible. In addition, updates, deletions, and additions may be made to the data in tracking database 302 via the web page generated by web server 303. For example, a party may desire to update status information about a particular monetary package via the web site, or may desire to add a new monetary package with a new identifier not previously included in tracking database 302.

Tracking interface 304 may be used as an alternative interface into tracking controller 301 and tracking database 302, without the need for an Internet web page. For example, data and queries may be provided to tracking controller 301 via tracking interface 304 using a short messaging system (SMS) message or other type of messaging from a cellular telephone.

FIG. 3 further shows an example of a third party system 305 (e.g., the computer system of armored carrier 104). System 305 may be embodied as or otherwise include a computing device, and may further include or be coupled with an identifier reader such as an RFID scanner 306 or a bar code reader. In this example, RFID scanner is configured to read an RFID tag 309 that is contained inside or otherwise attached to a bag 307 that also contains a quantity of monetary items 308.

Using such a setup, the third party may, for example, read the identifier stored in RFID tag 309 using RFID scanner 306 (which may be a handheld or fixed location device), forward that identifier to tracking interface 304 or web server 303 along with the current status of bag 307 (e.g., in custody of the bank vault at a certain time and date). This current status may be added to the data in tracking database 302 and associated with the identifier. Then, when that party or another party later queries tracking database 302 for the same identifier, the status of bag 307, including the most recent status discuss above, may be returned in response to the query.

RFID tag 309 may be a passive RFID tag that does not contain its own power source. Rather, a passive RFID tag (e.g., its memory, controller, and transmitter) is powered by power inherent to a signal that is received from RFID scanner 306 or another signal source. Alternatively, RFID tag 309 may be an active RFID tag that contains its own power source.

The above discussion in connection with FIGS. 1-3 describes but a few examples of how monetary package tracking might be implemented. These and other implementations, as well as various features that may be provided in connection with monetary package tracking, will be discussed in further detail below.

The tracking features of the cash supply chain described above and illustrated in FIGS. 1-3 can be used in methods for predicting future cash supply chain status, as well as methods for changing the operation or performance of the cash supply chain in connection with such predictions. In general, these methods utilize tracking and position information for the monetary packages in the supply chain in calculating and/or predicting future states of the cash supply chain and the monetary packages therein. Actions can then be taken to change the operation or performance of the cash supply chain in connection with such calculations and predictions. Many aspects of these methods can be performed by a computing device, such as the centralized tracking system 101 described above or another computing device in communication with the centralized tracking system 101. In addition, the computing device may be configured to automatically perform certain aspects of these methods, which, as used herein, refers to performance of an action by a computing device without direct manual initiative, such as according to computer-executable instructions.

Figure 4:
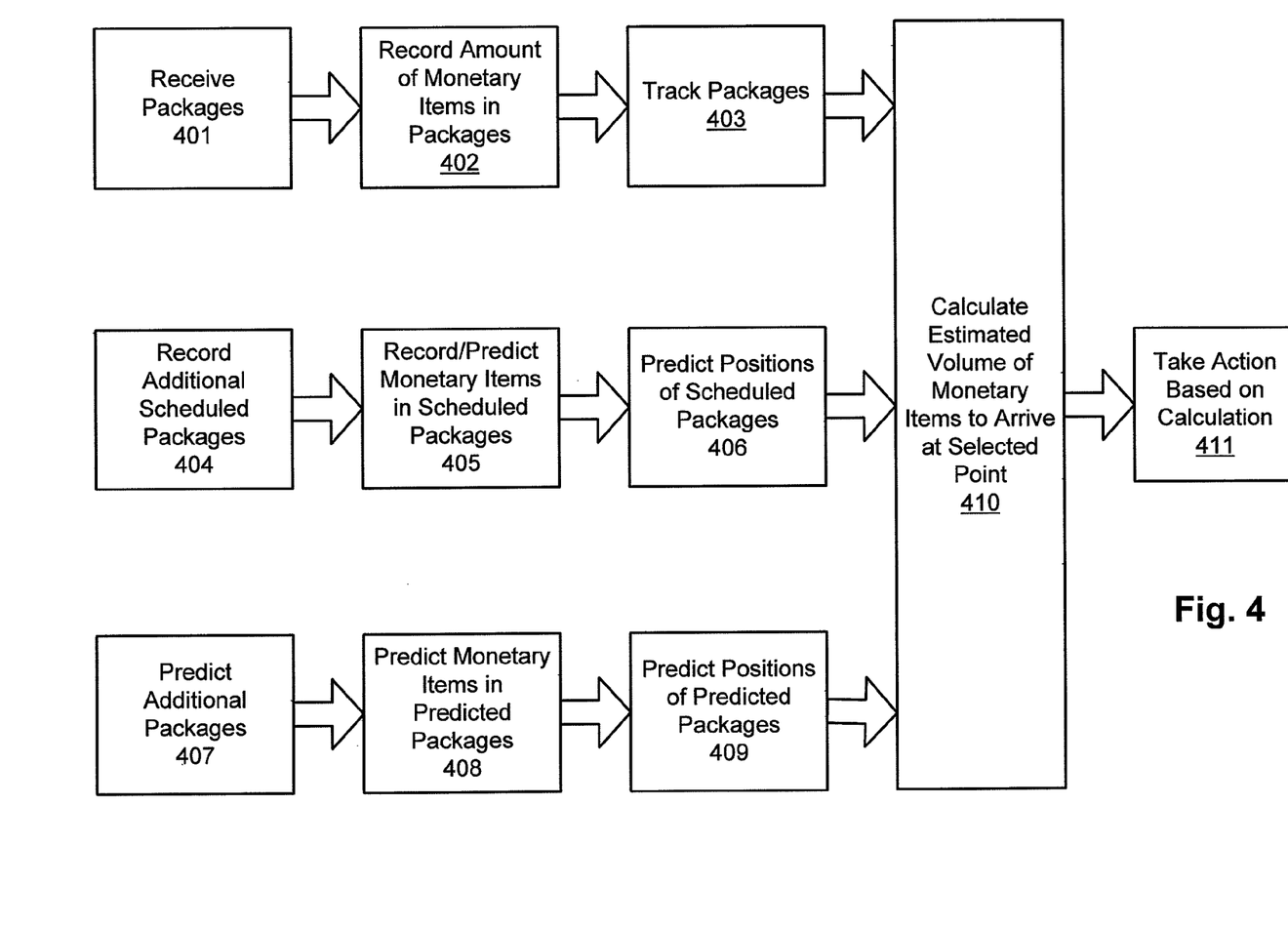
FIG. 4 is a flow diagram of an illustrative method for predicting future cash supply chain status.

One example embodiment of a method for predicting future cash supply chain status is illustrated in FIG. 4. The method utilizes tracking of monetary packages received into the cash supply chain, as described above, as well as future monetary packages not yet received into the cash supply chain. Future monetary packages may include additional scheduled monetary packages that are scheduled to be received into the cash supply chain and/or additional predicted monetary packages that are predicted to be received into the cash supply chain, based on past history. The method may further incorporate consideration of the amount of monetary items in each package or future package. In an already-received package, the amount of monetary items may be generally known and recorded. In the case of future packages, the amount of monetary items may need to be predicted or estimated. Information used for these predictions, as well as other predictions described herein, can be obtained from various sources. For example, data may be stored in the centralized tracking system 101 or in other internal systems, data may be obtained from input by clients or other third parties, data may be obtained by other internal computing devices or systems, data may be stored in external systems (including clients' and carriers' systems), and data may further be obtained by other known techniques.

In the embodiment of the method shown in FIG. 4, one or more monetary packages are received into the cash supply chain at step 401. For deposits, the monetary package(s) are received at a deposit location 103 as described above. The amount of monetary items in each package is declared and recorded at step 402. It is understood that the amount of monetary items in each package, if known, can be declared and recorded before the monetary packages are received. The positions of the monetary packages are tracked by centralized tracking system 101 (e.g., by tracking controller 301) as they move throughout the various points in the cash supply chain at step 403, in accordance with monetary package status updates to centralized tracking system 101 provided from the various points as described above. The tracking may be performed using data gathered through techniques as described above, including RFID tracking, barcode tracking, internal system transaction code tracking, and manual data entry, among other techniques known in the art. It is understood that such points on the cash supply chain may include, for example, the client 102, the deposit location 103, the carrier 104, the bank vault 105, and the pickup location 106, as well as other points which may exist in various embodiments of a cash supply chain. The tracking can also be extended to external processing centers, such as suppliers of suppliers and customers of customers.

Generally, scheduled monetary packages are scheduled to be deposited by a client or other party into the cash supply chain, such as at a deposit location 103 in FIG. 1. In other words, the party has made a request, appointment, or other record indicating that one or more monetary packages will be deposited, which record may include a date and/or time for deposit. This scheduling record may be generated by centralized tracking system 101 and recorded in database 302, in response to such a scheduling request. The amount or approximate amount of monetary items in the package(s), or the amount planned by the depositor to be in the monetary package(s), may also be a part of the record, and optionally also the denominations thereof. In another embodiment, the amount of monetary items in the package(s) is unknown, and may be predicted or estimated, either automatically or manually with or without the use of a computing device. This prediction can be made based on the deposit history of the party depositing the monetary package, such as an average or typical amount of monetary items contained in the party's past deposits or time patterns derived from past deposits. In other embodiments, the prediction can be made based on other factors, and may be incorporate monetary package-specific input received from the party making the deposit. For example, the prediction can incorporate quality predictions, which may include a predicted likelihood of error, such as the probability of issuance of a deposit correction notice.

In the embodiment of the method shown in FIG. 4, a record is made by centralized tracking system 101 of additional scheduled monetary packages that are scheduled to be received into the cash supply chain at step 404. In one embodiment, the record also includes a scheduled date and/or time when the additional monetary packages are scheduled to be deposited. The amount of monetary items (optionally by denomination and possibly including breakdown by checks/coin/other) expected to be in each of the additional scheduled monetary packages is recorded at step 405, which may involve prediction of the amount of monetary items in each scheduled monetary package, as described above. It is understood that the amount of monetary items in each package, if known, can be recorded before the monetary packages are received. At step 406, the positions of the scheduled packages are predicted, which may be performed automatically or manually with or without the use of a computing device. The recordation and prediction steps 404-406 may be performed by centralized tracking system 101. For example, the recorded data may be received by tracking interface 304 and/or web server 303, and recorded in tracking database 302. Also, the predictions may be implemented by tracking controller 301.

The position of each package is predicted for at least one specified time and/or date, but in some embodiments, the monetary package positions may be predicted at several times and/or dates. It is understood that the positions of monetary packages along the cash supply chain can be predicted at any of a plurality of different points along the cash supply chain. Predicting the positions of scheduled monetary packages can be performed in several ways. In one embodiment, predicting positions of monetary packages can be done based on historical client patterns, factoring in a typical or average time period for a monetary package to advance from one point to another in the cash supply chain. In another embodiment, additional or alternate factors may be considered in predicting future positions of the additional scheduled monetary packages. For example, the prediction can incorporate quality predictions, such as a predicted likelihood of error, as described above. The history of a financial institution and/or the cash supply chain may also be incorporated into the prediction, such as internal operational data that indicates how quickly monetary items typically move through the cash supply chain.

Generally, predicted monetary packages are those packages that are not scheduled to be received into the cash supply chain, but are expected to be scheduled and/or received in the future, based on consideration of historical patterns and/or other factors that may be known to tracking controller 301 and represented by data stored in tracking database 302. In one embodiment, one or more predicted monetary packages are predicted to be received based on history of the clients from which the packages are expected to be received. The "history" considered in predicting additional monetary packages may be financial history of the cash supply chain, such as a transactional history of one or more clients, and may include historical patterns, statistical data, and/or other types of information. For example, the prediction may involve consideration of historical patterns, such as when a client frequently deposits a monetary package on a specific day of the week. In other words, a particular party may have historically deposited monetary items or initiated a change order every Monday and Thursday, for example, in which case it may be reasonably predicted that such a deposit or change order will continue to be implemented in the same pattern in the future. As another example, the prediction may additionally or alternatively involve consideration of statistical data, such as the statistical frequency of deposits by a specific client (e.g., every 4 business days). Other statistical factors, such as standard deviation or statistical error may be incorporated into the prediction. For example, the prediction can incorporate quality predictions, such as a predicted likelihood of error, as described above. Further factors may also be involved in predicting the additional predicted monetary packages, such as time of day, seasonal patterns (weekly, monthly, holiday), special events, client segment, geography, denominations, vendor/carrier schedules and workflow, process or product family, overall monetary balances and inventories for a financial institution, patterns of Federal Reserve shipments, cross-shipping charges, and other factors. The prediction may include an expected date, location, and/or time of day when and/or where the monetary package is predicted to enter the cash supply chain, and may possibly include denomination data as well. In one embodiment, the predictions are made automatically by a computing device such as tracking controller 301, but may also be made manually, with or without the use of a computing device.

The amount or approximate amount of monetary items expected to be in the predicted monetary package(s) may also be predicted or estimated, either automatically or manually with or without the use of a computing device such as tracking controller 301. This prediction can be made as described above, such as based on the history of the party expected to deposit the monetary package, for example an average or typical amount of monetary items contained in the party's past deposits or a pattern derived from such past deposits. The prediction can also incorporate quality predictions, such as a predicted likelihood of error, as described above.

In the embodiment of the method shown in FIG. 4, predictions are made of one or more additional monetary packages that are expected to be received into the cash supply chain at step 407. In one embodiment, the prediction also includes a predicted date and/or time when the additional monetary packages are predicted to be deposited. The amount of monetary items in each of the additional predicted monetary packages is predicted at step 408. Record(s) may be made of the predictions of receiving the monetary packages and/or the amount of monetary items in such packages. At step 409, the positions of the monetary packages are predicted, as described above, which may be done automatically or manually with or without the use of a computing device. The position of each predicted package is predicted for at least one specified time and/or date, but in some embodiments, the monetary package positions may be predicted at several times and/or dates. It is understood that the positions of monetary packages can be predicted at any of a plurality of different points along the cash supply chain at one or more times/dates. Predicting the positions of the predicted monetary packages can be performed in any of the ways described above with respect to the scheduled monetary packages, based on the predicted time and/or date when the monetary packages are predicted to be received.

In the embodiment of the method shown in FIG. 4, a calculation or other determination is made to estimate the quantity of monetary items that is expected to arrive at a selected point or points on the cash supply chain, at step 410. The estimated quantity of monetary items may be calculated to arrive on a specified day and/or at a specified time, at any time, from minutes or hours in the future to days, weeks, months, or years in the future. Calculating the estimated quantity of monetary items may be based on the tracked positions and expected positions of monetary packages throughout the cash supply chain. Other factors may be incorporated into the calculations, such as the expected speed with which the monetary packages are expected to move through the cash supply chain, which may be based on internal historical data from past shipments. The calculation may be further based on the recorded or predicted amount of monetary items in each of the monetary packages. Accordingly, the estimated quantity of monetary items may reflect an expected number of monetary packages to be received, an expected amount of bills, coins, checks, and the like to be received (with or without regard to denomination) and/or an expected total amount of monetary items to be received. Further, the estimated quantity of monetary items may be calculated and reported over a time period. For example, the amount of monetary items expected to be received at various times over the course of a given day may be calculated.

In one embodiment, the calculation is based at least on the tracked positions of the monetary packages that have been received into the cash supply chain, but may also be based on the predicted positions of scheduled additional monetary packages and/or predicted additional monetary packages. The calculations may be made for a specified or selected day or for a plurality of different days. In one embodiment, the expected quantity of monetary items can be calculated on a same-day basis, as well as for a future time, such as for one or more future days. Further, the calculations can be made for a specified time of day or times of day on a selected day or days.

Figure 6:
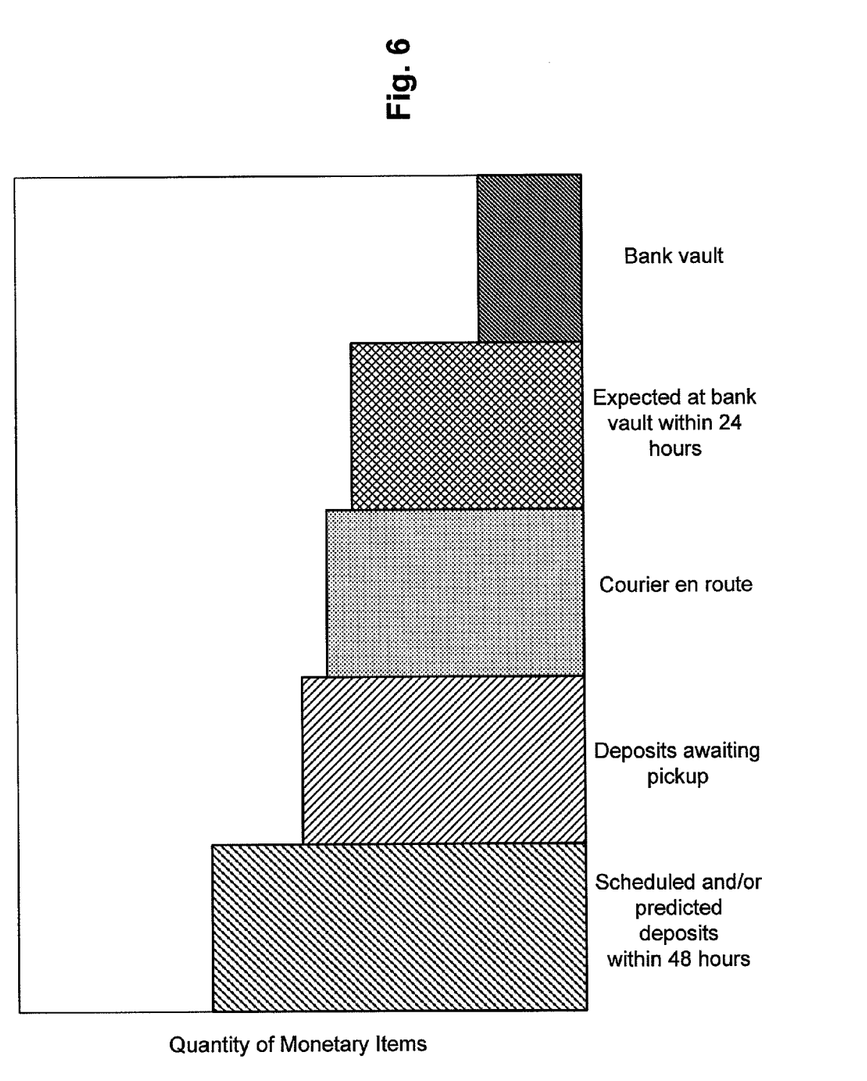
FIG. 6 is a graph illustrating an example of a present cash supply chain status, including predicted future status.
Figure 7:
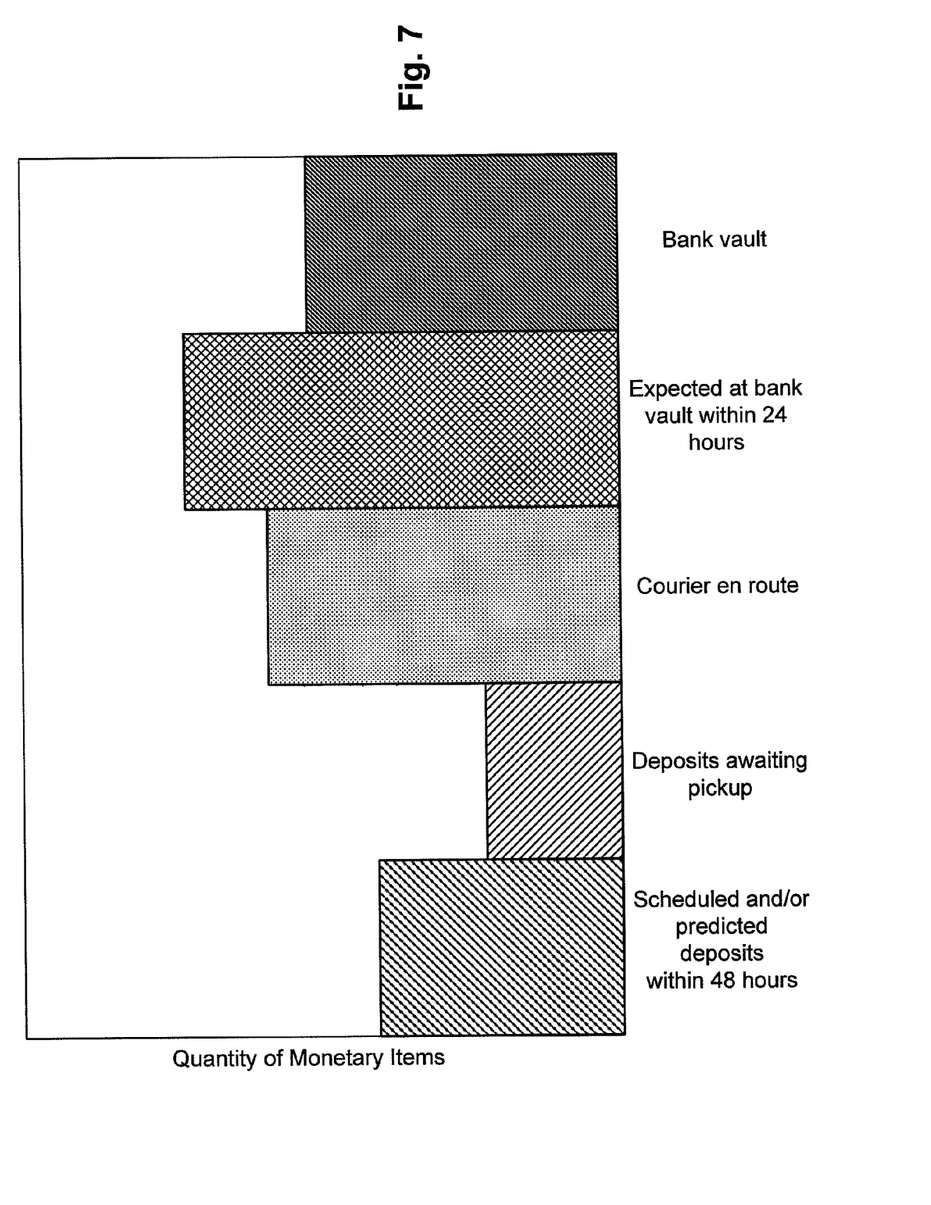
FIG. 7 is a graph illustrating another example of a present cash supply chain status, including predicted future status, generated at a later time than the graph of FIG. 6.

FIGS. 6 and 7 provide illustrations of monetary package positions throughout the cash supply chain, demonstrating the movement of monetary items along the supply chain.

FIG. 6 illustrates data reflecting the quantity of monetary items that is present at various points along the cash supply chain at a specified date and/or time. FIG. 7 illustrates the quantity of monetary items that is present at the same points along the cash supply chain at a later date/time than depicted in FIG. 6, for example 48 hours later. As seen from FIGS. 6 and 7, monetary items may often move through the cash supply chain in a wave-like manner. In other words, when the a relatively large quantity of deposits are scheduled, predicted, and awaiting pickup an earlier point in time (FIG. 6), the amount of monetary items arriving or close to arriving at the bank vault at a later time (FIG. 7) is likely to be relatively large. The opposite is also often true, such as when a small amount of deposits are scheduled, predicted, or awaiting pickup. Knowledge of historical patterns and trends of monetary movement throughout the cash supply chain, such as illustrated in FIGS. 6 and 7, can assist in more accurate predictions of future states of the cash supply chain. As described below, graphs such as those shown in FIGS. 6 and 7 may be generated as reports to show the state of the cash supply chain at a particular date and/or time.

Once a determination is made to estimate the quantity of monetary items that is expected to arrive at a selected point on the cash supply chain, one or more actions can be taken by a party, such as a party at the selected point or centralized tracking system 101, based on the estimated quantity of monetary items, at step 411. Such actions may include changing one or more operating parameters or practices based on the estimated incoming monetary items. For example, in one embodiment, employee staffing levels at the selected point can be adjusted on a same-day basis and on a future-day basis. Greater number of handling employees can be scheduled to work on days that are expected incur greater monetary flow, and lesser numbers of employees can be scheduled for expected lighter days. Further, employee levels can be adjusted on a time-of-day basis, or in other words, employee staffing levels can be adjusted for busier or lighter times of a selected day. As another example, equipment levels can be adjusted based on the expected incoming monetary flow, similarly to the adjustment of employee staffing levels. As a further example, carrier deliveries to the selected point can be adjusted or coordinated based on the incoming monetary flow. For example, carriers scheduled to deliver monetary packages on a busy day can be diverted to a less busy day. Additionally, if a large quantity of monetary items is expected to arrive at a certain time of day on a given day, one or more of the carriers may be instructed to arrive at an earlier specified time, to avoid forcing employees to deal with excessive volume of monetary packages all at once. Further operating parameters that can be changed include a denomination of the monetary items, one or more deadlines, such as an internal vault deadline at the selected point, operating hours at the selected point, federal reserve requirements, and customer prioritization. Still further, information such as that in FIGS. 6 and 7 can be used to predict staffing requirements, denominations of monetary items to be received, different inventories of monetary items in process, machine capacity requirements, research volumes, overall monetary inventory within the system, non-credit losses, real-time productivity, and other related information.

Another action that can be taken by the party, based on the determined future quantity of monetary items, is generating a report of the present state of the cash supply chain. FIGS. 6 and 7 represent examples of such reports, which contain information regarding both present quantities of monetary items and predicted future quantities of monetary items at various points along the cash supply chain. This report may be generated by the centralized tracking system 101, and also may be automatically generated by a computing device. In other examples, such a report may be more complex and may contain additional or other information in graphical or non-graphical form.

The tracking features of the cash supply chain described above and illustrated in FIGS. 1-3, as well as the predicting features described above and illustrated in FIG. 4, can also be used in methods for predicting future monetary positions of clients of the entity that controls tracking system 101 (e.g., customers of a bank). In one embodiment, these methods utilize tracking and position information for the monetary packages in the supply chain and predictions of future states of the cash supply chain in creating a funds estimate for a client, to project the client's future monetary position. In another embodiment, these methods utilize calculation of scheduled and/or predicted future changes in monetary position in creating a funds estimate for a client. Actions can then be taken in connection with a financial transaction based on the funds estimate. Many aspects of these methods can be performed by a computing device, such as the centralized tracking system 101 described above or another computing device in communication with the centralized tracking system 101. In addition, the computing device may be configured to automatically perform certain aspects of these methods, which, as used herein, refers to performance of an action by a computing device without direct manual initiative, such as according to computer-executable instructions.

Figure 5:
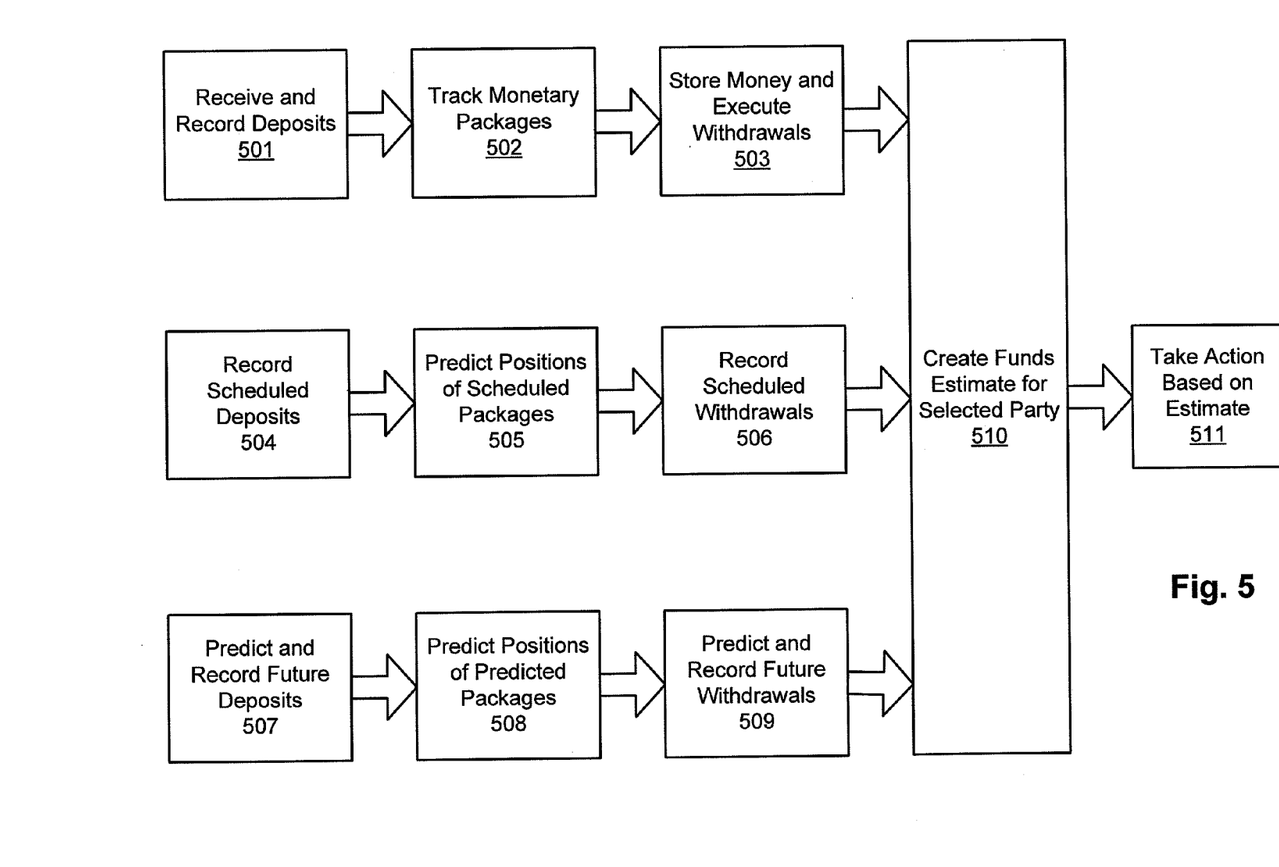
FIG. 5 is a flow diagram of an illustrative method for predicting future client funds status.

One example embodiment of a method for predicting future client funds status is illustrated in FIG. 5. The method incorporates consideration of deposits and withdrawals of funds that affect the client's monetary position, as well as consideration of scheduled and/or predicted future deposits and withdrawals. This embodiment also utilizes tracking of monetary packages received into the cash supply chain, as described above, as well as projected positions of future monetary packages not yet received into the cash supply chain.

In the embodiment shown in FIG. 5, deposits are received into the cash supply chain at step 501, and a record is made of receipt. In this embodiment, at least some of the deposits may be received in the form of one or more monetary packages. However, other types of deposits are possible, such as electronic funds deposits or transfers from a client-controlled account. For deposits, the monetary package(s) are typically received at a deposit location 103 as described above, but may also be received in another manner. The record may also include an amount or approximate amount of monetary items in the package(s), or planned by the depositor to be in the monetary package(s), and optionally also the denominations and other contents thereof, as described above. The positions of the monetary packages are tracked as they move throughout the various points in the cash supply chain at step 502, such as by the centralized tracking system 101 as described above. The money in the monetary packages is stored, for example in a client account, and one or more withdrawals may be executed, at step 503. Such withdrawals include both monetary packages that are withdrawn by the client owner, as well as other types of funds withdrawals, including electronic withdrawals and transfers of funds from a client-controlled account. In one example, the withdrawal may be in the form of a change order or similar transaction, where a party requests a withdrawal of funds in the form of monetary items having specific denominations.

The embodiment of the method shown in FIG. 5 may also incorporate scheduled future deposits and withdrawals and/or predicted future deposits and withdrawals. Scheduled deposits and withdrawals are scheduled to occur in the future, similarly to the description above of additional monetary packages scheduled to be received. Predicted deposits and withdrawals may be predicted in the same way described above with respect to the predicted receipt of future monetary packages. Such predicted future deposits and withdrawals may be based on history of the cash supply chain and/or a particular client or clients, or any other factor described above. It is understood that different types of actual, scheduled, or predicted transactions may be applied to actual funds, scheduled future funds, and predicted future funds. For example, the method may involve scheduled or predicted withdrawals of funds actually in the cash supply chain, or predicted withdrawals of funds that are scheduled or predicted to be received in the cash supply chain. Further, at least some of the scheduled and predicted deposits and withdrawals may be in the form of monetary packages moving into and out of the cash supply chain, and may also be in other forms described above, including electronic funds transfers.

In the embodiment shown in FIG. 5, scheduled deposits are recorded at step 504, which, as described above, may be performed similarly to the recordation of additional scheduled monetary packages. The record of the scheduled deposits may include a scheduled, planned, or predicted amount of money in each scheduled deposit. In the embodiment illustrated, at least some of the scheduled deposits are in the form of monetary packages. At step 505, the positions of these scheduled additional monetary packages at the specified time are predicted, as described above. At step 506, scheduled withdrawals, if any, are recorded, which may also include a scheduled or predicted amount of each scheduled withdrawal. At step 507, future deposits are predicted, as described above, and such predictions are recorded, which may include recording the predicted amount of money in each deposit. In the embodiment illustrated, at least some of the predicted deposits are in the form of monetary packages. At step 508, the positions of these predicted additional monetary packages are predicted, as described above. At step 509, future withdrawals, if any, are predicted as described above, and such predictions may be recorded, which may include a predicted amount of such withdrawals.

In the embodiment shown in FIG. 5, a funds estimate is created for one or more selected parties/clients at step 510. The funds estimate may be created by the centralized tracking system 101, and may be generated by a computing device. As described above, this funds estimate generally incorporates at least a consideration of funds already in the cash supply chain and changes in such funds, i.e. deposits and withdrawals already executed. Additionally, the funds estimate may incorporate scheduled and/or predicted changes in funds, as described above. In creating the funds estimate, a determination is made to predict a future funds position of the client or clients, based on the actual funds and changes in funds, as well as any future funds and changes in funds which are selected to be used in the calculation. The determination may be based on additional factors as well. For example, the determination may take into account all arrangements between a financial institution and a client, payments and orders that are predicted, scheduled, or in process, funds availability, transportation schedules, bank production times, historical information, special events that impact cash flow, and time advance of the prediction, as funds estimates at nearer times can often be predicted more accurately than times farther into the future.

The funds estimate may include one or more various different types of information. In one embodiment, the funds estimate includes an estimated amount of money that will be in the client's accounts and/or an estimated amount of money that will be available for access or use by the client on a selected time or date. In another embodiment, the funds estimate includes information on the positions of the client's funds throughout the cash supply chain, including the tracked positions of various monetary packages. The funds estimate may be in the form of a report, which may include information similar to the graphs of FIGS. 6 and 7 as well as, additionally or alternatively, other types of information described above. For example, the funds estimate may be organized by individual location and/or in aggregate. As another example, the funds estimate may include funds availability in time increments (e.g., a breakdown of availability in 12, 24, 48 hrs, and the like). As yet another example, the funds estimate may include some indication of the statistical error (standard deviation, and the like) of the prediction. As a further example, the funds estimate may include deposit correction notice predictions, client store monetary levels, and change order recommendations, ship in recommendations, and other product and/or service recommendations. As a still further example, the funds estimate may include a detailed statement of debits and credits and associated detail (e.g., broken down by identity/location, amount, and the like), as well as confidence levels and actions requested based on the predicted cash position. It is understood that the funds estimate may include any combination of these types of information, as well as other types of information.

After the funds estimate has been created, action can be taken based on the funds estimate, at step 511. In one embodiment, a bank or other financial institution may take action in furtherance of a financial transaction, on behalf of the client, based on the funds estimate. For example, the financial institution may extend a line of credit to the client based on the predicted future funds position included in the funds estimate. Extending a line of credit may include making payments to various creditors of the client, which may exceed the client's current funds position. Additionally, the financial institution may permit the client to withdraw a change order, as described above, based on the client's predicted future funds position. Further, the funds estimate may be stored, physically or electronically, and may be transmitted or otherwise made available to the client. The funds estimate may be made available to the client in the form of one or more reports generated for the client reflecting the funds estimate, as described above. The funds estimate may also be made available by displaying the funds estimate to the client, such as in a physical medium or electronically, and the funds estimate may be accessible over the Internet. Other actions may be taken based on the funds estimate, such as adding and/or removing services, investment decisions, making payments, performance tracking, and other related actions.

As stated above, FIGS. 4 and 5 illustrate examples of one or more aspects of methods for handling funds. The steps of the methods described above can be accomplished by means and/or components contained within the cash supply chain and/or within a financial institution, such as the centralized tracking system 101, a computing device connected to the centralized tracking system 101, and the memories and processors thereof, and may also be accomplished by non-computer means, such as by institutional employees. Other components of a cash supply chain or financial institution may also constitute means for accomplishing aspects of the present invention, as understood by those skilled in the art. It is understood that one entity may or may not perform each and every aspect of the methods described herein, and that aspects may be performed by one or more other entities.

As will be appreciated by one of skill in the art upon reading the following disclosure, various aspects described herein may be embodied as a method, a computer program product or computer readable medium, or a system, such as a cash supply system, a financial institution, a computer system, or other type of system.

The various aspects described herein may provide one or more benefits not provided by prior systems and methods for operating a cash supply chain and/or a financial institution. For example, the monetary package tracking features and other associated features described herein may enable greater efficiency and effectiveness of operation of a cash supply chain. Additionally, the monetary position estimating features described herein may enable more effective client service and may enable a financial institution and its clients to better plan and adjust for future events. For example, business intelligence can be made more predictive and proactive, customer servicing can be enhanced, productivity can be improved, monetary levels can be optimized at the bank level as well as at the customer or supplier level, and transportation can be made quickly and more efficiently. Still other potential benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific examples have been illustrated and described, numerous modifications may be implemented without significantly departing from the spirit of the invention.

What is claimed is:

1. A method, comprising:
tracking, by a computer system, a plurality of monetary packages throughout a cash supply chain, each of the monetary packages containing a plurality of monetary items; and
determining a total quantity of monetary items that is estimated to arrive at a point along the cash supply chain at a future time, by the computer system, based on the tracking of the monetary packages and a quantity of monetary items in each monetary package; and
changing at least one operating parameter at the point based on the determined total quantity of monetary items that is estimated to arrive at the point along the cash supply chain at the future time.

2. The method of claim 1, wherein the at least one operating parameter is selected from a group consisting of: an employee staffing level at the point, an arrival time of a transporter carrying at least some monetary items to the point, a denomination of the monetary items, a deadline, operating hours at the point, federal reserve requirements, and customer prioritization.

3. The method of claim 1, wherein the determining further includes determining, by the computer system, the total quantity of monetary items estimated to arrive at the point at a specified time of day on a specified day.

4. The method of claim 1, wherein the determining of the total quantity of monetary items further comprises determining, by the computer system, the total quantity of monetary items based on at least one status of an additional monetary package that is predicted to be received into the cash supply chain.

5. The method of claim 1, wherein the tracking comprises tracking the monetary packages, by the computer system, using at least one tracking device selected from a group consisting of: RFID tags, bar codes, and internal system transaction codes.

6. A method, comprising:
tracking, by the computer system, a plurality of monetary packages throughout a cash supply chain;
predicting, by the computer system, an additional monetary package to be received into the cash supply chain at a first future time, wherein the additional monetary package is not yet received into the cash supply chain and is not scheduled to enter into the cash supply chain; and
determining a total quantity of monetary items that is estimated to arrive at a point along the cash supply chain at a second future time, by the computer system, based on the tracking of the monetary packages and the predicted additional monetary package.

7. The method of claim 6, further comprising:
changing at least one operating parameter at the point based on the determined total quantity of monetary items.

8. The method of claim 7, wherein the at least one operating parameter is selected from a group consisting of: an employee staffing level at the point, an arrival time of a transporter carrying at least some monetary items to the point on a specified day, a denomination of the monetary items, a deadline, operating hours at the point, federal reserve requirements, and customer prioritization.

9. The method of claim 6, wherein the determined total quantity of monetary items is estimated to arrive at the point on a future day.

10. The method of claim 6, further comprising:
predicting a quantity of monetary items in the additional monetary package, by the computer system,
wherein determining the estimated total quantity of monetary items is further based on the predicted quantity of monetary items in the additional monetary package.

11. The method of claim 6, further comprising:
predicting a future position in the cash supply chain of the predicted additional monetary package, by the computer system,
wherein the determining of the total of monetary items further comprises determining the quantity of monetary items based on the predicted position of the additional monetary package.

12. The method of claim 6, wherein the prediction of the additional monetary package is based on a financial history of the cash supply chain.

13. A method, comprising:
   recording positions of a plurality of monetary packages at each of a plurality of points along a cash supply chain, by a computer system, each of the monetary packages containing a plurality of monetary items; and
   determining a total quantity of monetary items that is estimated to arrive at a selected point along the cash supply chain, by the computer system, based on the positions of the monetary packages and a quantity of monetary items in each of the monetary packages.

14. The method of claim 13, further comprising:
   changing at least one operating parameter at the selected point based on the determined total quantity of monetary items.

15. The method of claim 14, wherein the at least one operating parameter is selected from a group consisting of: an employee staffing level at the selected point, an arrival time of a transporter carrying at least some monetary items to the selected point on a specified day, a denomination of the monetary items, a deadline, operating hours at the selected point, federal reserve requirements, and customer prioritization.

16. The method of claim 13, wherein the determining further includes determining, by the computer system, the total quantity of monetary items estimated to arrive at the selected point at a specified time of day on a specified future day.

17. The method of claim 13, wherein the positions of the monetary packages are recorded by the computer system, using at least one tracking device selected from a group consisting of: RFID tags, bar codes, and internal system transaction codes.

18. A method comprising:
   determining, by a computer system a quantity of monetary items that is estimated to arrive at a point along a cash supply chain at a plurality of future times; and
   coordinating, an arrival time of a transporter carrying at least some of the monetary items to the point, by the computer system, comprising instructing the transporter to arrive at the point at a modified arrival time that is different from an original scheduled arrival time of the transporter at the point, based on the quantity monetary items estimated to arrive at the point on at least one of the original scheduled arrival time and the modified arrival time.

19. The method of claim 18, wherein a large quantity of monetary items is estimated to arrive at the point at the original scheduled arrival time, and wherein a smaller quantity of monetary items is estimated to arrive at the point at the modified arrival time.

20. The method of claim 18, wherein coordinating the arrival time is further based upon estimated employee staffing at the point.

21. The method of claim 18, wherein determining the quantity of the monetary items is based on tracking the monetary packages throughout the cash supply chain, by the computer system.

22. The method of claim 21, wherein the monetary packages are tracked using input from transporters transferring the monetary packages.

23. The method of claim 18, wherein the transporter is an armored carrier.

24. The method of claim 1, wherein the monetary packages are in the form of bags containing monetary items.

* * * * *